A. GRIEVES.
COMBINED SIDE DELIVERY HAY RAKE AND TEDDER.
APPLICATION FILED MAR. 18, 1918.
1,435,293.
Patented Nov. 14, 1922.
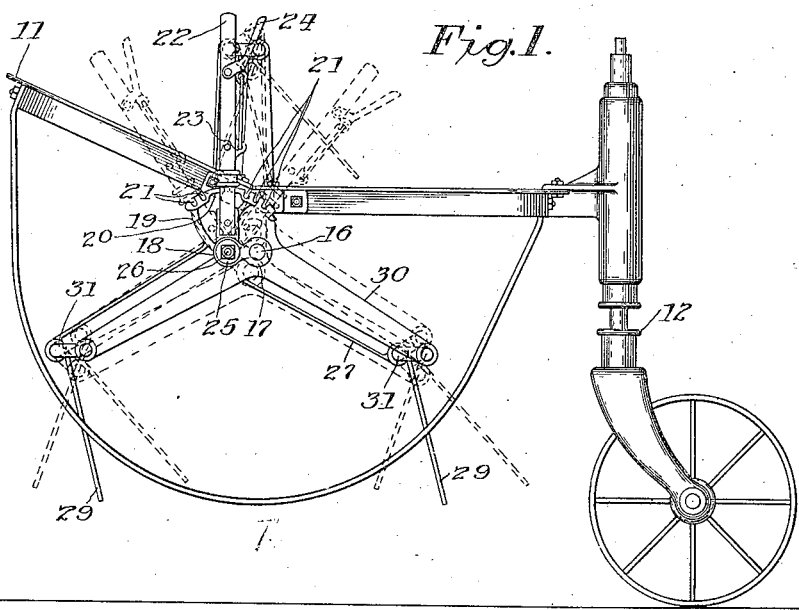
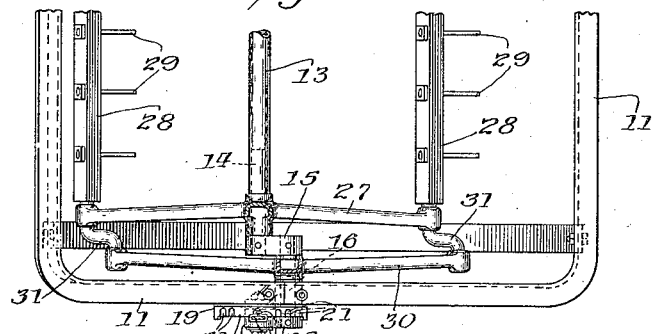
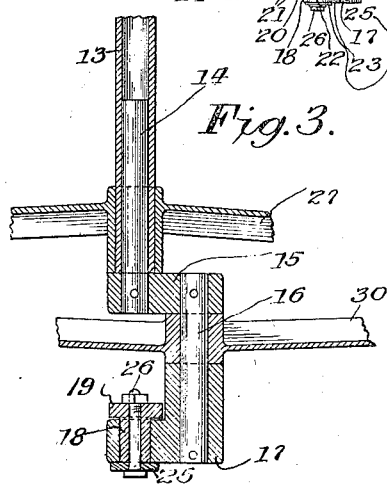
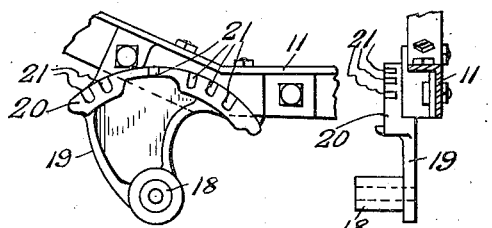
Inventor.
Albert Grieves,
by Chas. E. Lord
Atty Patented Nov. 14, 1922.

1,435,293

UNITED STATES PATENT OFFICE.

ALBERT GRIEVES, OF SPRINGFIELD, OHIO, ASSIGNOR, BY MESNE ASSIGNMENTS, TO INTERNATIONAL HARVESTER COMPANY, A CORPORATION OF NEW JERSEY.

COMBINED SIDE-DELIVERY HAY RAKE AND TEDDER.

Application filed March 18, 1918. Serial No. 223,216.

*To all whom it may concern:*

Be it known that I, ALBERT GRIEVES, a citizen of the United States, residing at Springfield, in the county of Clark and State of Ohio, have invented certain new and useful Improvements in Combined Side-Delivery Hay Rakes and Tedders, of which the following is a full, clear, and exact specification.

This invention relates to combined side delivery hay rakes and tedders, and more particularly to means for adjusting the teeth thereof to change their angularity.

One of the objects of my invention is to simplify and improve the control of the operating teeth of side delivery rakes and tedders.

Another object is to control the teeth of machines of this type in such a manner that the rake shaft is not thrown out of line in the various adjustments.

These and other objects are accomplished by providing in a combined hay rake and tedder suitably supported operating teeth and control means for changing the angularity of the teeth in an improved manner.

One embodiment of my invention is illustrated in the accompanying drawings, and in these drawings,—

Figure 1 is a fragmentary end elevation of a combined side delivery hay rake and tedder embodying my improved control features;

Figure 2 is a fragmentary plan view of the same;

Figure 3 is a detail sectional view on an enlarged scale showing the arrangement of the various cooperating parts by which the rake and teeth are controlled;

Fig. 4 is an enlarged detail view of the sector plate showing the manner of securing same to the frame of the machine; and Fig. 5 is an end view of Fig. 4 showing the stud formed on the sector plate.

Only that portion of a side delivery hay rake and tedder has been illustrated which is necessary for the showing of my invention.

The combined machine illustrated includes the usual diagonally extending frame 11 suitably supported at its rear or outer end by the usual caster wheel construction 12. The raking cylinder is revolubly mounted in the frame 11 and includes a supporting pipe 13 journaled at its inner end in suitable bearings on the frame of the machine (not shown), and carried at its outer end by a stub shaft 14 mounted on a crank arm 15 which is carried by a short crank shaft 16 having its opposite end secured to a second crank 17. The crank 17 is rotatably mounted on an outwardly extending stud 18 integral with a sector plate 19 which is rigidly secured to the outer end of the diagonally extending frame 11. The sector plate 19 is provided on its upper edge with an outwardly extending flange 20, having a series of notches 21 in its outer surface. The crank 17 has secured thereto an upwardly extending lever 22 provided with the usual pawl 23 and pawl releasing mechanism 24. As shown in Fig. 1 the pawl 23 cooperates with the notches 21 in the sector plate 19 to hold the lever in a fixed position of adjustment.

The crank 17 is secured against endwise movement on the stud 18 by means of a washer 25 which is held in place by a bolt 26. The supporting pipe 13 has secured thereto at each end a three-armed spider 27 (only one being shown) the ends of the arms of the spiders rotatably receiving three rake heads 28 carrying the usual raking teeth 29, which may be used for raking and tedding purposes. An additional offset or eccentric spider 30 is rotatably mounted on the short crank shaft 16 intermediate the crank arm 15 and the crank arm 17, and this offset spider 30 is connected to the adjacent spider 27 and rake heads 28 by means of suitable cranks 31.

In Fig. 1 the intermediate position of the teeth is illustrated in full lines and the two extreme positions are illustrated in dotted lines. Referring to this figure it will be seen that as the lever 22 is thrown from the central or vertical position forwardly to the dotted line position shown at the left, the rake teeth will take the position shown in dotted lines at the right, which position is the proper position of the teeth for tedding purposes. As the lever is thrown from the vertical position to the right, in Fig. 1, the rake teeth will be thrown to the position shown at the left in said figure, which is the proper position for raking purposes.

In connection with the construction described and shown in this application, attention is called to the fact that the pivot point for the lever 22 and the crank arms 15 and 17 is in substantial alignment with the longitudinal axis of the rake shaft 13. This is an important feature to be considered, since it is necessary to have these two pivot points in alignment in order to avoid a torsional strain on the shaft as the rake teeth are adjusted from one position of angularity to another position. As the crank arms 15 and 17 are rotated in the construction illustrated, there will be no movement of the outer end of the rake shaft 13 and therefore any breakage due to the twisting of this shaft is avoided by the use of my improved construction.

In view of the fact that the spider 30 is substantially the only element changed in position by the adjustment of the rake teeth, it will be readily understood that the manipulation of these rake teeth is a very simple operation and requires very little effort on the part of the operator.

It is evident that there may be various modifications of the invention as particularly herein shown and described, and it is my intention to cover all such modifications which do not involve a departure from the spirit and scope of the invention as set forth in the following claims.

1. In a combined hay rake and tedder, a rotary frame including a rake shaft, rake teeth carried by said frame, and means for changing the angularity of said teeth, said means being movable on a pivot member separate from and in substantial alinement with said shaft.

2. In a combined hay rake and tedder, a rotary frame including a rake shaft, rake teeth carried by said frame, a supported movable member with which said rotary frame is associated and operatively connected to said teeth, and means operatively connected to said supported member for moving the latter about a pivot member separate from and in substantial alinement with said rake shaft to change the angularity of said teeth.

3. In a hay rake, a frame, a rake shaft carried thereby, a rake head operatively connected to said rake shaft, rake teeth carried by said rake head, and means pivoted to said rake shaft and on said frame for varying the angularity of said rake teeth.

4. In a hay rake, a frame, a rake shaft carried thereby, a rake head operatively connected to said rake shaft, rake teeth carried by said rake head, and means including a U-shaped member pivoted to said rake shaft and on said frame for varying the angularity of said rake teeth.

5. In a hay rake, a frame, a rake shaft carried thereby, rake heads operatively connected to said shaft, rake teeth carried by said rake heads, and means movable about a pivot separated from and in substantial alignment with the axis of said rake shaft, for rotating said rake heads.

6. In a hay rake, a rotary raking frame including rake teeth and single means for supporting one end of said raking frame and for angling said rake teeth.

7. In a hay rake, a rotary raking frame including a shaft, rake heads carried thereby and rake teeth carried by said rake heads, and single means for supporting one end of said rake shaft and for angling said rake teeth.

8. In a hay rake, a frame, a crank shaft having at one end a crank arm journaled on said frame, and at its opposite end a crank arm carrying a stub shaft, a rake shaft journaled on said stub shaft, rake teeth carried by said rake shaft, and means carried by said crank shaft intermediate said crank arms for changing the angularity of said rake teeth as said crank shaft is rotated about its axis.

9. In a hay rake, a frame, a crank shaft having a crank arm journaled on said frame, and a second crank arm carrying a stub shaft, a rake shaft journaled on said stub shaft, supporting members carried by said rake shaft, rake teeth carried by said supporting members, and means carried by said crank shaft and operatively connected to said rake teeth for changing the angularity of said teeth as said crank shaft is rotated about its axis.

10. In a hay rake, a frame, a bracket carried by said frame having an outwardly projecting journal member, a crank shaft having at one end a crank arm journaled on said journal member, and at its opposite end a crank arm having a stub shaft secured thereto, a rake shaft supported on said stub shaft, supporting members carried by said rake shaft, rake teeth carried by said supporting members, a member carried by said crank shaft and operatively connected to said rake teeth, and means carried by one of said crank arms for rotating said crank shaft about its axis to change the angularity of said teeth.

11. In a hay rake, a frame, a notched sector carried by said frame and having an outwardly projecting journal member, a crank shaft having an arm journaled on said journal member, said arm having a lever secured thereto, means carried by said lever for cooperating with said notched sector, a second arm carried by said crank shaft and having a stub shaft secured thereto, a rake shaft journaled on said stub shaft and having rake teeth operatively connected thereto, and means carried by said crank shaft and operatively connected to said rake teeth for changing the angularity of said teeth as said crank shaft is rotated by said lever about its axis.

12. In a hay rake, a rake frame, a rake shaft carried thereby, a rake head operatively connected to said rake shaft, rake teeth carried by said rake head, and means including a manually operable lever pivoted to said rake shaft and on said frame for varying the angularity of said rake teeth.

13. In a hay rake, a rotary raking frame, including rake teeth and means mounted on a single bearing for supporting one end of said raking frame and for aligning said rake teeth.

In testimony whereof I affix my signature.

ALBERT GRIEVES.